Oct. 19, 1954  J. P. DE CLOUD  2,692,005
METHOD FOR MAKING REINFORCING MEMBERS FOR TIRES
Filed May 21, 1951  2 Sheets-Sheet 1

INVENTOR.
Joseph P. De Cloud
BY
Hamilton & Hamilton
Attorneys.

Oct. 19, 1954      J. P. DE CLOUD      2,692,005
METHOD FOR MAKING REINFORCING MEMBERS FOR TIRES
Filed May 21, 1951

INVENTOR.
Joseph P. DeCloud
BY
Hamilton & Hamilton
Attorneys.

Patented Oct. 19, 1954

2,692,005

UNITED STATES PATENT OFFICE 2,692,005

METHOD FOR MAKING REINFORCING MEMBERS FOR TIRES

Joseph P. De Cloud, Merriam, Kans.

Application May 21, 1951, Serial No. 227,395

4 Claims. (Cl. 154—14)

This invention relates to new and useful improvements in the process of making reinforcing members for tires or other similar articles, such as detachable auxiliary tire treads, sometimes known as tire "overshoes."

The principal object of the present invention is the provision of a method for forming reinforcing members of the class described which is fast, economical, and which will produce reinforcing members of superior quality.

Another object is the provision of a method for producing reinforcing members of the class described including the usual bead wires and reinforcing cording or fabric, in which the reinforcing member may be produced in a substantially continuous strip, whereupon it may be cut into length corresponding to the desired circumference of the finished tire product, and then formed into the proper tire shape.

A further object is the provision of a method for producing a reinforcing member of the class described, in which the reinforcing fabric is formed by one or more endless cords wrapped in helical form, the bead wires inserted in said helix, and the helix collapsed on itself.

With these objects in view, as well as other objects which will appear in the course of the specification, reference will be had to the drawing, which illustrates the various steps of my improved method, and in which.

Figure 1:
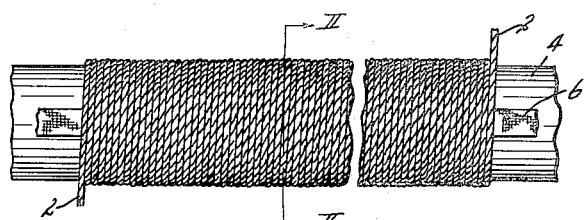
Fig. 1 illustrates the initial step of winding a cord about a mandrel, said view being longitudinally foreshortened.
Figure 2:
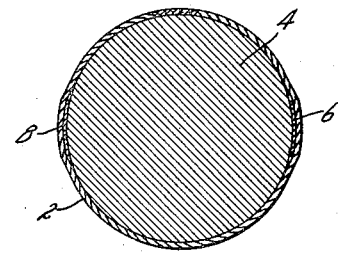
Fig. 2 is an enlarged section taken on line II—II of Fig. 1.

Like reference numerals apply to similar parts throughout the several views, which illustrate the various steps involved in my process. The first step is to wind a single continuous strand of cord 2 in a substantially closed helical form, as by wrapping it about a cylindrical mandrel 4. The length of the cord helix formed thereby may correspond to the inner or bead diameter of the tire or auxiliary tread in which the finished reinforcing member is to be used, or may be formed in a single continuous length and later cut off in the desired lengths, as will be hereinafter described. The cord may be of any suitable fibrous material, usually cotton or nylon. A pair of cloth fabric strips 6 and 8 are disposed longitudinally within the helix along diametrically opposite sides thereof, between the cord and mandrel 4. It is apparent that said strips could be placed against the mandrel before the cord is wound, or inserted after the winding of the cord, or in the case of a continuous process could be fed to the mandrel ahead of the cord.

Figure 3:
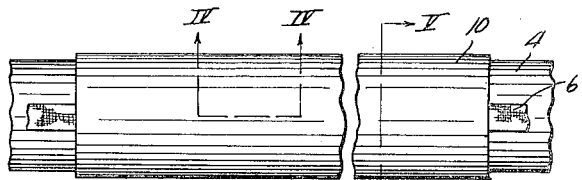
Fig. 3 is a view similar to Fig. 1, after the initial thin coating of rubber has been applied to the cord.
Figure 4:
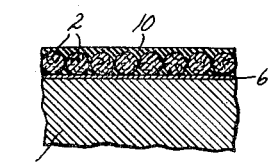
Fig. 4 is an enlarged fragmentary section taken on line IV—IV of Fig. 3.
Figure 5:
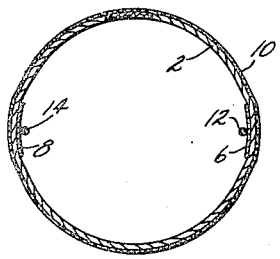
Fig. 5 is an enlarged section of the cord helix after it has been removed from the mandrel, taken on line V—V of Fig. 3, and with the bead wires in place.
Figure 7:
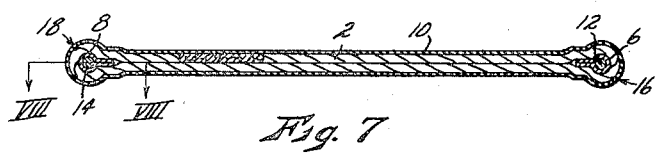
Fig. 7 is an enlarged section taken on line VII—VII of Fig. 6.
Figure 6:
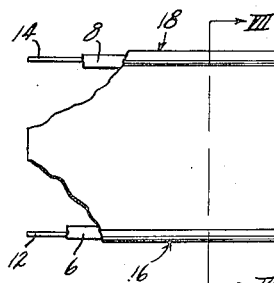
Fig. 6 is a face view of the substantially flat reinforcing member formed by collapsing the cord helix shown in Fig. 5, partially broken away.
Figure 8:
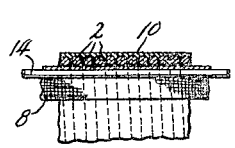
Fig. 8 is a fragmentary section taken on line VIII—VIII of Fig. 7.

The cord helix is then sprayed with or dipped in a liquid rubber to obtain thereon an initial thin coating 10 of rubber, as shown in Figs. 3 and 4. This coating binds the loops of cord together and to cloth strips 6 and 8 to hold them in proper relative position during subsequent operations. The mandrel may be suitably treated to prevent adherence of the rubber thereto. The cord helix is then removed from the mandrel, and a pair of bead wires 12 and 14 are inserted longitudinally therethrough as shown in Fig. 5 to lie respectively along the midlines of cloth strips 6 and 8. The helix is then collapsed or flattened on itself as shown in Figs. 6 and 7, so that bead wires 12 and 14 lie respectively in the longitudinal edge folds thereof, forming beads 16 and 18. During this collapsing or flattening, cloth strips 6 and 8 are folded longitudinally about the bead wires as shown, and thereafter function to protect the loops of cord 2 which pass about the bead wires from undue friction and wearing against said wires.

Figure 9:
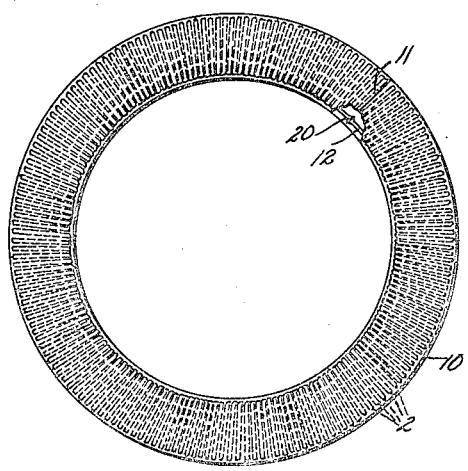
Fig. 9 is an elevational view of the reinforcing member after it has been formed into ring shape and the ends of the bead wires connected, partially broken away.
Figure 11:
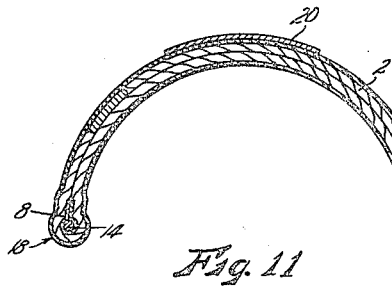
Fig. 11 is an enlarged section taken on line XI—XI of Fig. 10.
Figure 10:
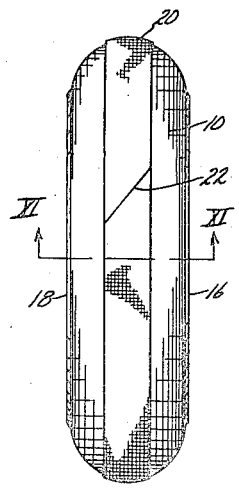
Fig. 10 is an edge view of the member as shown in Fig. 9, with the peripheral fabric tape applied thereto.

In the next step the reinforcing member, which at this time has the form of a flat strip as shown in Figs. 6 and 7 is formed in the shape of the outer peripheral portion of a torus, as shown in Figs. 9, 10, and 11, the ends of the strip being brought into butting relationship at 11, and the opposite ends of each bead wire are joined by any suitable method such as butt-welding, as indicated at 20. It will be noted in Fig. 9 that the portions of the cord passing about bead wires 12 and 14 remain in the same longitudinally spaced relationship along said wires during this forming operation, while the reaches of said cord intermediate said bead wires spread apart slightly in a direction peripherally of the torus, due to the larger circumference of said intermediate portion. The initial thin coat of rubber 10 is sufficiently yieldable to permit this spreading.

It will be readily understood that when the cord helix is collapsed there will be formed two layers of cord reaches, and that the reaches of cord in said layers are inclined in opposite directions from the centerline of the flattened strip, due to the original helical form of the cord. This inclination of the cord reaches strengthens the reinforcing member longitudinally. In order to impart a still greater longitudinal strength, a strip of fabric 20 is wrapped peripherally about the formed reinforcing member as shown in Figs. 10 and 11, and may be secured thereto as by a suitable adhesive, or by spraying with liquid rubber or the like. It is apparent that strip 20 must be applied after the reinforcing member has been formed in torus shape, in order to permit the above described spreading of the cord reaches during said forming operation. The ends of strip 20 are brought together in an angled butt-joint 22 as indicated in Fig. 10, said butt-joint being peripherally offset from the joint 11 of the reinforcing member.

Figure 12:
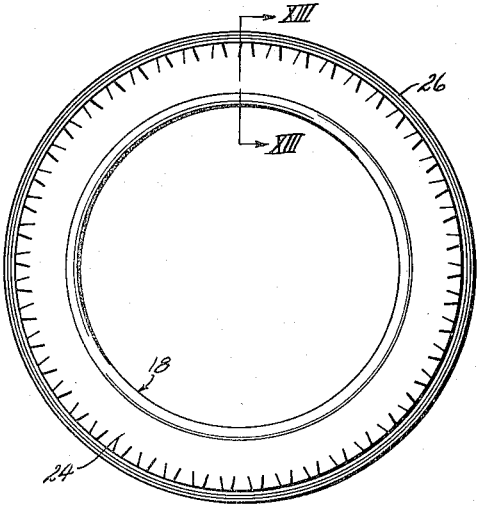
Fig. 12 is a side elevation of a detachable auxiliary tire tread in which my reinforcing member is used.
Figure 13:
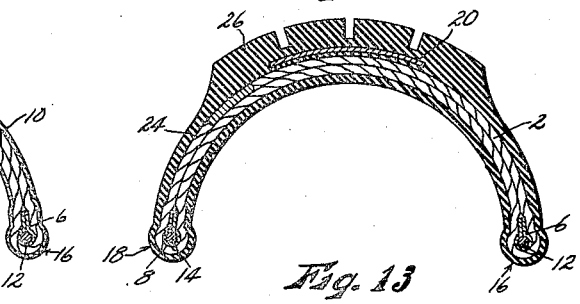
Fig. 13 is an enlarged section taken on line XIII—XIII of Fig. 12.

The reinforcing member is then complete, and ready for insertion, for example, in a detachable auxiliary tire tread 24, as shown in Figs. 12 and 13. In this step the formed reinforcing member is enclosed in a suitable mold and additional rubber is applied thereto under heat and presure to provide a thicker protective coating over the reinforcing member and to provide the thick outer peripheral layer 26 of rubber in which the tread grooves are formed. The heat and pressure cause the added rubber to unite firmly with the thin initial rubber coating 10, and the union of the layers of said initial coating, to form a substantially unitary rubber body in which all parts of the reinforcing structure are bound.

Figure 14:
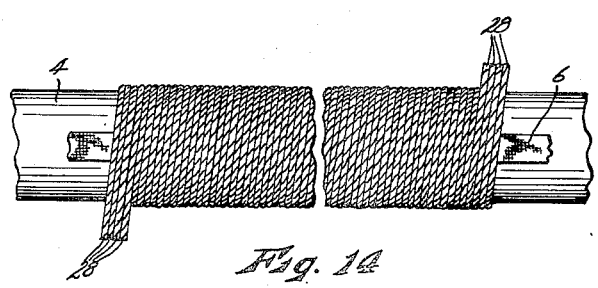
Fig. 14 is a view similar to Fig. 1 showing the use of a plurality of reinforcing cords, rather than a single cord as shown in Fig. 1.

Fig. 14 shows a modification of the first step of the process wherein a plurality, in this case four, cords 28 are wound helically about the mandrel 4 rather than the single cord illustrated in Fig. 1. This modification provides that the reaches of the cords in the finished product will be inclined more nearly parallel to the longitudinal midline of the reinforcing member, and hence produces a reinforcing member having greater longitudinal strength.

While I have shown and described a specific process, it is apparent that many slight variations therein could be made without departing from the spirit of my invention.

What I claim as new and desire to protect by Letters Patent is:

1. The method of making a reinforcing member for a tire casing comprising winding a cord in helical form, inserting a pair of wires longitudinally through said helix to lie respectively along diametrically opposite sides thereof, collapsing said helix on itself to form a flat, elongated band with said wires disposed in the longitudinal edge folds thereof, forming said band to present the outer peripheral portion of a torus, with the ends of said band in abutting relation, and joining together the opposite ends of each of said wires.

2. The method of making a reinforcing member for a tire casing comprising winding a cord in helical form, inserting a pair of fabric strips longitudinally through said helix to lie respectively along diametrically opposite sides thereof, inserting a pair of wires longitudinally through said helix to lie respectively along the midlines of said fabric strips, collapsing said helix on itself to form a flat, elongated band, the longitudinal edge folds of said band being at the midlines of said fabric strips whereby said fabric strips are folded over said wires, forming said band to present the outer peripheral portion of a torus, and joining together the opposite ends of each of said wires.

3. The method of making a reinforcing member for a tire casing comprising winding a cord in helical form, inserting a pair of fabric strips longitudinally through said helix to lie respectively along diametrically opposite sides thereof, applying a thin coating of liquid rubber to said helix whereby the turns thereof are bound together and to said fabric strips, inserting a pair of wires longitudinally through said helix to lie respectively along the midlines of said fabric strips, collapsing said helix on itself to form a flat, elongated band with said wires disposed respectively within the longitudinal edge folds thereof, forming said band to present the outer peripheral portion of a torus with the ends of said band in abutting relation, and permanently joining together the opposite ends of each of said wires.

4. The method of making a reinforcing member for a tire casing comprising winding a cord in helical form, inserting a pair of fabric strips longitudinally through said helix to be respectively along diametrically opposite sides thereof, applying a thin coating of liquid rubber over said helix to bind the turns thereof together and to said fabric strips, inserting a pair of wires longitudinally through said helix to be respectively along the midlines of said fabric strips, collapsing said helix on itself to form a flat, elongated band with said wires disposed respectively in the longitudinal edge folds thereof, forming said band to present the outer peripheral portion of a torus with the ends of said band in abutting relation, welding together the opposite ends of each of said wires, and disposing a fabric strip about the outer periphery of said torus, with the ends of said last named fabric strip abutting in peripherally offset relation from the abutment of the ends of the band forming said torus.

References Cited in the file of this patent

UNITED STATES PATENTS

| Number | Name | Date |
|---|---|---|
| 2,480,811 | McCoy | Aug. 30, 1949 |
| 2,501,644 | Kraft et al. | Mar. 21, 1950 |
| 2,522,138 | Schaffer | Sept. 12, 1950 |
| 2,581,920 | Kuhn | Jan. 8, 1952 |